US008666601B1

(12) United States Patent
Van Wiemeersch et al.

(10) Patent No.: US 8,666,601 B1
(45) Date of Patent: Mar. 4, 2014

(54) VISIBILITY OF A VEHICLE IGNITION LOCATION

(71) Applicant: Ford Global Technologies, LLC, Dearborn, MI (US)

(72) Inventors: John Robert Van Wiemeersch, Novi, MI (US); Todd Ansbacher, Westland, MI (US); Jeremy Rawlings, Canton, MI (US); Jerry Bonnici, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/870,276

(22) Filed: Apr. 25, 2013

(51) Int. Cl.
*B62D 6/00* (2006.01)
*B62D 1/189* (2006.01)
*B62D 1/181* (2006.01)

(52) U.S. Cl.
USPC ............... 701/41; 701/36; 318/467; 318/264

(58) Field of Classification Search
None
See application file for complete search history.

(56) References Cited

U.S. PATENT DOCUMENTS

| | | | | |
|---|---|---|---|---|
| 5,164,645 A | * | 11/1992 | Furuse et al. | 318/467 |
| 5,207,451 A | * | 5/1993 | Furuse et al. | 280/775 |
| 5,270,932 A | * | 12/1993 | Yoshizawa et al. | 701/41 |
| 6,672,421 B2 | * | 1/2004 | Larsson et al. | 180/271 |
| 6,723,934 B2 | | 4/2004 | Enright | |

FOREIGN PATENT DOCUMENTS

| | | |
|---|---|---|
| DE | 10151010 A1 | 4/2003 |
| DE | 10316350 A1 | 10/2004 |

* cited by examiner

*Primary Examiner* — John R Olszewski
*Assistant Examiner* — Nicholas K Wiltey
(74) *Attorney, Agent, or Firm* — Raymond L. Coppiellie; Brooks Kushman P.C.

(57) ABSTRACT

Automatically rotating a steering wheel to provide improved locatability of an ignition if the steering wheel reduces ignition locatability and the vehicle is parked. Indications that the vehicle is parked may include when an automatic transmission is in park, a park brake is set, an autopark event concludes, or during a remote start event. Rotating the steering wheel to provide improved ignition locatability while turning the vehicle wheels less than 10 degrees.

19 Claims, 3 Drawing Sheets

VISIBILITY OF A VEHICLE IGNITION LOCATION

TECHNICAL FIELD

This disclosure relates to vehicles with an ignition switch or lock located behind a steering wheel in which the steering wheel may reduce visibility of the ignition location, and specifically to the automatic rotation of the steering wheel into a position that improves ignition locatability through the steering for a driver in a normal seating position.

BACKGROUND

A steering wheel is a type of steering control for a vehicle that is rotated by a driver to provide steering inputs into the vehicle. Simply stated, by rotating the steering wheel to the left or right, the vehicle may be steered to the left or right, respectively. Steering wheels are generally circular having an outer ring that may be grasped by the driver's hand connected to a center hub by one or more spokes. The hub of the steering wheel may be connected to a steering-wheel shaft that runs down into a steering column, and into, under, or behind an instrument panel. In automobiles, the steering-wheel shaft is typically connected to the wheels of the vehicle through a steering system. A steering system may have a gearbox to transfer movement and energy from one device to another. The gearbox may also be used to increase torque by allowing for the steering wheel to be rotated numerous revolutions while only turning the wheels a portion of a revolution.

A rack-and-pinion gearbox and a recirculating-ball gearbox are commonly used to provide a direct mechanical link between the steering wheel and the steerable vehicle wheels. However, some steer-by-wire systems that do not require direct mechanical contact have been developed. Steer-by-wire systems measure the rotational input of the steering wheel and use actuators to turn the steerable wheels of the vehicle. Steer-by-wire systems may work in combination with a gearbox, or may replace the gearbox all together and use the actuators to provide the torque needed to turn the vehicle wheels. Most modern steering systems, whether they are a traditional steering system or a steer-by-wire system, typically employ actuators to provide power assisted steering to aid in the turning of the wheels requiring less input effort at the steering wheel.

In addition to its use in steering, the steering wheel may provide a location for numerous other vehicle controls. The steering wheel has long been the usual location for a button to activate an automobile's horn. Modern automobiles may also have other controls, such as cruise control, audio system and telephone controls, and paddle shifters built into the steering wheel to minimize the extent to which the driver must take their hands off the wheel (and eyes off the road) while driving. The hub of the steering wheel is also commonly used as a location for a driver side airbag. The addition of the airbag, shifters, controls and buttons has decreased visibility of other vehicle components located behind and under the steering wheel.

Some vehicles use an ignition switch or lock to start the vehicle. The ignition switch may be a button that the driver presses to start the vehicle. The ignition lock may be used with a key, in which the key is inserted into the ignition lock to start the vehicle. Ignition switches and locks may be located on the steering column or on the instrument panel near the base of the steering column. The steering wheel may make it difficult for the driver to see the ignition switch or lock location. In the case of an ignition lock, the reduced visibility may make it more difficult for the driver to insert a key. This visibility problem can be further compounded for rectangular wave-cut key blades that lack the classic pointed key tip which provides some self-location aid to align the key with the ignition lock hole. Some vehicles have used interior lighting to illuminate the steering lock in an attempt to provide better visibility of the steering lock, however if a driver has to bend over to look around the steering wheel to locate the steering lock, often the driver's head may block the interior lighting defeating its purpose. Further, on some right-hand drive vehicles the driver may have to open the driver door to allow space for their head when bending over to look for the ignition lock.

SUMMARY

One aspect of this disclosure is directed to a system for improving vehicle ignition locatability. This system has an actuator capable of rotating a steering wheel and an indicator capable of providing an indication that the vehicle is in a parked condition. The system also has a controller capable of accessing the indication that the vehicle is in a parked position and communicating with the actuator. The controller is programmed to rotate the steering wheel to a position that provides at least partial visibility of an ignition location based at least upon the vehicle being in the parked condition. Indications that the vehicle is in a parked condition may include when an automatic transmission is in a park position, when a parking brake is set, an autopark event is concluded, or during a remote start event. The rotation of the steering wheel may be performed with an engine running or off. The rotation of the steering wheel may be performed with the engine running to avoid battery key-off power consumption during the process.

Another aspect of this disclosure is directed to a system for improving locatability of an ignition in a parked vehicle. This system has a controller in communication with a steering-angle sensor configured to indicate a steering-wheel position. The controller in this system also has a predetermined map of steering-wheel positions corresponding to levels of ignition locatability. The controller is programmed to rotate the steering wheel to a position with a greater level of ignition locatability when the steering wheel is at a position with a lower level of ignition locatability.

A further aspect of this disclosure is directed to a method for improving ignition visibility in a vehicle. The method includes rotating a steering wheel to a final position that provides at least partial visibility of an ignition based at least upon the steering wheel being in an initial position that substantially blocks driver visibility of the ignition and the vehicle being in a parked condition. The method identifies a parked condition as including when an automatic transmission is in park, when a parking brake is set, when an autopark event is concluded, engine on or off, or during a remote start event.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
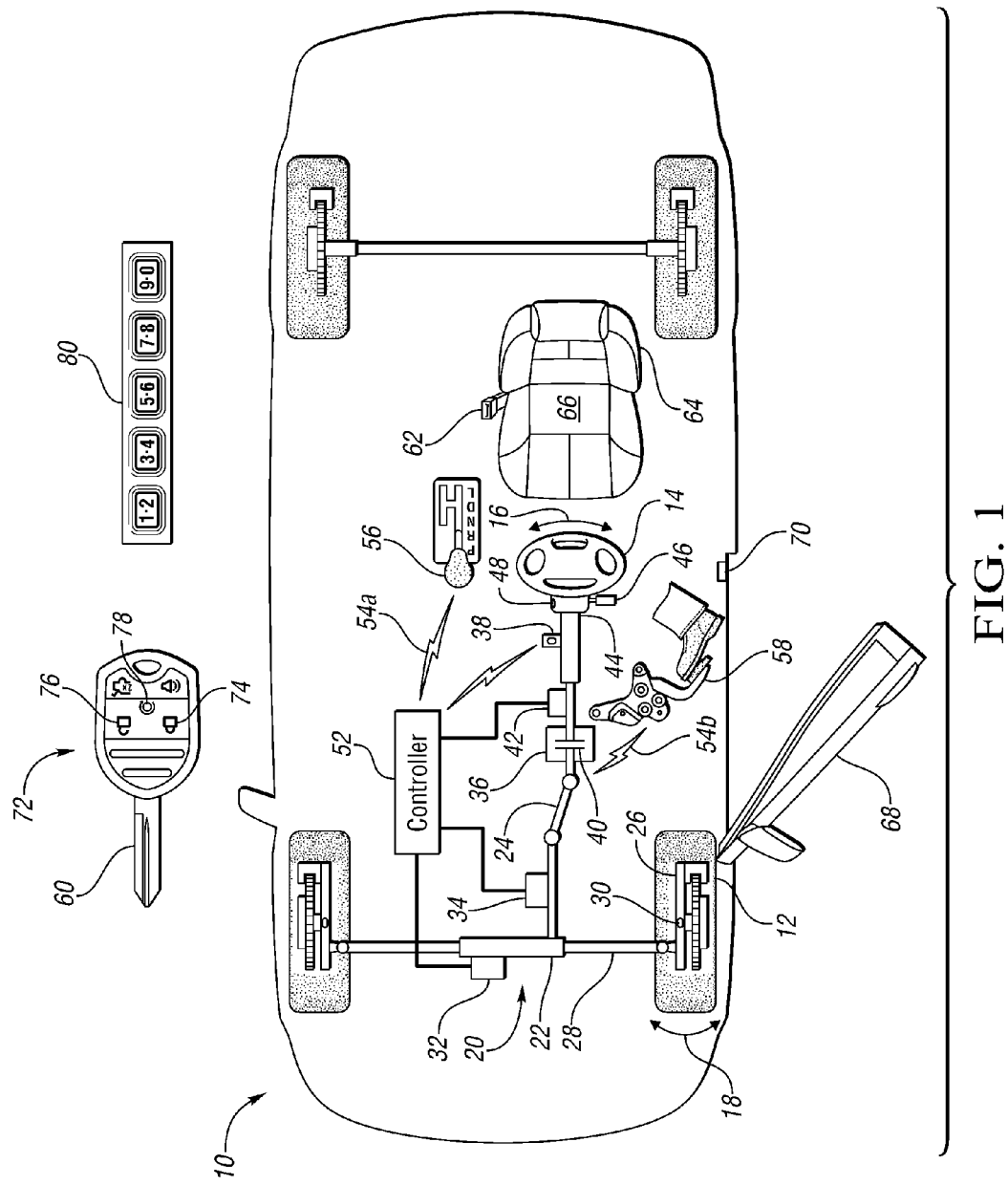
FIG. 1 is a diagrammatic view of a system for improving ignition location visibility in a vehicle.

FIG. 1 shows a vehicle 10 with a wheel 12 that is designed to be in contact with and roll over terrain or ground, also known as a road wheel. The wheel 12 supports the vehicle off of and allows the vehicle 10 to move over the ground. Wheel 12 may also be turnable and used to help steer the vehicle 10. The vehicle 10 may be an automobile, and the wheel 12 may be a wheel and tire assembly. In this example, as the wheel 12 rolls on the ground, the wheel 12 may be turned and the vehicle 10 will follow the path into which the wheel 12 has been turned. Alternatively, the wheel 12 may be any directional providing component used to aid in the steering of the vehicle. Examples of other directional providing components are skis, sets of wheels with an endless track, rudders and ailerons. A steering wheel 14 may be connected, either directly or indirectly, to the directional providing component and the steering wheel 14 rotated to move the directional providing component to aid in the steering of the vehicle 10.

A rotational input, as shown by arrow 16, may be given to the steering wheel 14 resulting in a turning output of the wheel 12, as shown by arrow 18. The steering wheel 14 may be connected to the wheel 12 by a steering system 20. The steering system 20 may comprise a gearbox 22. The gearbox 22 shown in the figure is a rack-and-pinion gearbox, although other gearboxes may be used. The gearbox 22 may be used to translate rotational movement of the steering wheel 14 into transverse movement across the vehicle 10 and to increase torque from the steering input 14 to the output 18. The steering wheel 14 may be connected to the gearbox 22 by a steering-wheel shaft 24, such that the rotational movement 16 of the steering wheel 14 may be brought into the gearbox 22 by the steering-wheel shaft 24.

In the case of a rack-and-pinion gearbox, a pinion gear may be disposed near the end of the steering-wheel shaft 24 and mesh with teeth on a rack (not shown), and as the pinion gear rotates in its transversely fixed position, the rack may move back and forth across the vehicle 10. The wheel 12 may be mounted on a steering knuckle 26 via a hub and bearing assembly (not shown) and allowed to spin on the bearing relative to the steering knuckle 26. A tie rod 28 may be connected between the rack of the gearbox 22 and the steering knuckle 26 to transfer the transverse movement of the rack to the steering knuckle 26. The tie rod 28 may be connected to the steering knuckle 26 offset from a substantially vertical pivot point 30 of the steering knuckle 26, providing a pivoting motion of the steering knuckle 26 around the pivot point 30 in response to the transverse motion of the tie rod 28. The pivoting motion of the steering knuckle 26 provides the turning output as indicated by arrow 18.

The steering system 20 may be a power assist steering system. Power assist steering systems provide additional assistance in the rotation or translation of steering system components, such that when the steering wheel 14 is turned an actuator is engaged to help rotate or translate the steering components. Power assist steering systems requiring less effort of rotational input 16 to provide turning output 18 and turn the wheel 12. This is especially helpful when the vehicle is not moving. A power assist actuator may be provided by any known actuator source, examples include hydraulic power steering pumps and electric motors. A rack-and-pinion power assist motor 32 may be connected to the rack of a rack-and-pinion gearbox 22 such that when the motor 32 is energized it assists in the movement of the rack. A steering-wheel shaft power assist motor 34 may be connected to the steering-wheel shaft 24 such that when the motor 34 is energized it assists in the movement of the steering-wheel shaft 24.

The steering-wheel shaft 24 may connect the steering wheel 14 to the gearbox 22 directly, or the vehicle 10 may have an intermediary steer-by-wire steering system 36 in which the rotational input 16 does not, necessarily, provide a direct mechanical link to the turning output 18 of the wheel 12. In a steer-by-wire steering system 36 the rotational input 16 of the steering wheel 14 is measured and the system energizes actuators, such as motors 32, 34, to move the steering system 20 components to turn the wheel 12. A steering-angle sensor 38 may be used for sensing the angular rotation of the steering wheel 14. The steer-by-wire steering system 36 allows the steering wheel 14 to be rotationally disconnected from the steering system 20. Steer-by-wire steering systems 36 may generate a torque feedback to the driver by actively rotating the steering wheel 14 in response to wheel 12 movement such that the steering wheel 14 and wheel 12 rotate in a constant ratio which each other the same as a traditional direct mechanical link steering system. Steer-by-wire steering systems 36 may also change the ratio at different points of wheel 12 angular degrees, at different speeds of driving, or as selected by the driver. Similar to steer-by-wire steering systems 36, a vehicle may also be equipped with active front steering, in which the wheel 12 may be automatically turned without rotation of the steering wheel 14.

Steer-by-wire steering systems 36 may also have a backup mechanical link, such as a clutch 40 that allows the direct mechanical linkage of the steering wheel 14 to the steering system 20. The clutch 40 may be a normally closed clutch that is opened when energized and automatically closes providing direct engagement of the steering wheel 14 with the steering system 20 in case of a power loss. The clutch 40 is shown here in the middle of the steering-wheel shaft 24, however the steer-by-wire steering system 36 may have alternative disengagement locations and configurations. In the case where the clutch 40 is located on the steering-wheel shaft 24, a steering-wheel actuator 42 may be connected to the steering wheel 14 to rotate the steering wheel 14 together with, or separately from, the movement of the steering system 20. In the case where the clutch 40 is engaged, or if the vehicle 10 does not have a steer-by-wire steering system, such that the steering wheel 14 has a direct mechanical link with the movement of the steering system 20 components, any actuator 32, 34 could be used to rotate the steering wheel 14.

The steering-wheel shaft 24 may be at least partially disposed in a steering column 44. The steering wheel 14 may also have a steering-wheel column-lock 46. The steering-wheel column-lock 46 may be used to lock a steering wheel 14 such that the steering wheel 14 may not rotate, and as such the wheel 12 may not be able to turn. The steering-wheel column-lock 46 is a safety and anti-theft feature designed to keep the steering wheel 14 and wheel 12 from being turned when the vehicle 10 is off, in park, or a key has been removed from an ignition. The steering-wheel column-lock 46 may be mechanical and enabled by removing an ignition key and actuated by rotating the steering wheel 14 to specified positions in which a pin is disposed into a detent to lock the rotation of the steering wheel 14. Alternatively, the steering-wheel column-lock 46 may be an electrically driven pin and actuated when a push-button ignition switch is toggled to the off position, or a combination of the two.

The ignition 48 is shown disposed on the steering column 44, however the ignition 48 may be located in varying locations within the vehicle. An alternative location for an ignition location is on an instrument panel or dash (see FIG. 3). The ignition 48 is used to start the vehicle. The ignition 48 may be an ignition lock such that a key must be inserted for the vehicle 10 to start, or the ignition 48 may be a button, switch or tactile sensor that is depressed for the vehicle 10 to start. In the case where the ignition 48 is located behind the steering wheel 14, or such that the steering wheel 14 may be between the ignition location and a driver's line of sight, the steering wheel 14 may make it difficult to find the location of the ignition 48.

The vehicle 10 is shown with a controller 52 in communication with at least one actuator 32, 34, 42. The communication link between the actuators 32, 34, 42 and the controller 52 may be hard wired, as shown, or wireless. The controller 52 is programmed to rotate the steering wheel 14 to a position that provides at least partial visibility of the location of the ignition 48 (see FIGS. 3 and 5). The controller is programmed to rotate the steering wheel 14 based at least upon the vehicle 10 being in a parked condition. An indicator, such as those represented by arrows 54a and 54b, may be used to indicate that the vehicle 10 is in a parked condition. The controller 52 may be a stand-alone module, or integrated with other modules in the cabin or engine compartment, or in the steering wheel hub.

Indicator 54a is a signal that an automatic transmission (not shown) is in park. The automatic transmission may be determined to be in park when a shift lever 56, or a push-button in the case of a shift by wire gear selector, is in the park position. A sensor (not shown) may be used to provide indicator 54a and the controller may have access to the sensor directly or to the data the sensor provides via an internal communication network (not shown). An alternate indicator may be indicator 54b in which a park brake 58 is set. Similarly to the position of the shift lever 56, a sensor (not shown) may be used to recognize when the park brake 58 is set. Although the park brake 58 is shown as a foot pedal, other park brakes may be used, examples of which are a park brake handle or electronic switch. The indications that the vehicle is parked may be sent to the controller 52, or the controller 52 may request the data directly or indirectly from the indicators 54a, 54b.

An indicator that the vehicle 10 is in a parked condition may also be the conclusion of an autopark event. Autopark is a feature that allows an autopark system to automatically parallel or perpendicular park the vehicle 10. During an autopark sequence, the vehicle may use the steering system actuators 32, 34 to turn the wheel 12 as needed to perform the automatic parking of the vehicle 10. At the conclusion of the autopark sequence, the vehicle is in a parked position and the controller 52 may rotate the steering wheel 14 to be in a position better suited for ignition locatability. One advantage of rotating the steering wheel 14 into a position better suited for ignition locatability at the conclusion of an autopark event is that vehicle occupants are already prepared for the automatic rotation of the steering wheel 14 during the autopark sequence. Another advantage is that on a vehicle 10 with an engine, the engine may be running during the autopark sequence providing the power needed to operate the actuators without placing load on a battery.

An indicator that the vehicle 10 is in a parked condition may also be during a remote start event. A remote start event is when a driver sends a signal to start the vehicle 10 from outside of the vehicle 10. An advantage of rotating the steering wheel 14 into a position better suited for ignition locatability during a remote start event is that the vehicle 10 may not have any occupants inside. Another advantage, similar to that of the autopark sequence, is that on a vehicle 10 with an engine, the engine will be running during the remote start sequence providing the power needed to operate the actuators without placing a load on a battery. Similarly, on electrical vehicles that provide remote cabin conditioning while still connected to a charging line before use of the vehicle, the steering wheel may be rotated for improved ignition visibility while on AC power thus reducing the load on the 12V or EV battery.

The controller 52 may be further programmed to rotate the steering wheel 14 based at least upon a second indicator. The second indicator may be that of an action selected from a group consisting of a key 60 being removed from the ignition 48, a driver seatbelt being opened/closed as indicated by a seatbelt latch sensor 62, a driver entering/exiting a driver seat 64 as indicated by a seat weight sensor 66, a driver side door 68 being opened/closed as indicated by a door position sensor 70, or any combination of the above. The controller 52 may be further programmed to sequence a number of second indicators to indicate a driver has exited the vehicle, such as the door position sensor 70 indicating an opening of the door 68, followed by a seat weight sensor 66 indicating the absence of a weight in the seat 64, followed by the door position sensor 70 indicating the closing of the door 68. Alternative second indicators may be selected from a group consisting of a keyfob 72 lock button 74 or unlock button 76 being pressed, a keyfob 72 remote start button 78 being pressed, a keypad 80 lock/unlock command being initiated by the driver typing into the keypad 80 a recognized combination, a remote vehicle unlock command being sent via a cellular network or other non-keyfob initiated remote vehicle unlock command, a remote start command being sent via a cellular network or other non-keyfob initiated engine start such as a time-based, temperature-based or voltage-based engine start, or any combination of these or the previous second indicators.

The controller 52 may also be further programmed to inhibit rotation of the steering wheel 14 based at least upon a third indicator. The third indicator may be a condition selected from a group consisting of the vehicle being parked at an angle above a threshold angle, a torque of the steering wheel 14 being at a torque above a threshold torque, a torque of the wheel 12 being at a toque above a threshold torque, a battery state of charge being at a charge level below a threshold charge level, a battery voltage being at a level too high for safe powering of the actuator 32, 34, 42, vehicle 10 is in a pre-delivery plant, or a module fault code is being exhibited by any of the system components.

Sensors that may be used to measure and indicate vehicle angle are a longitudinal sensor, a pitch sensor, or a gyro sensor. If the vehicle 10 is parked on an incline above a threshold angle, then the wheels may be turned to position the wheel against a curb or be turned such that the vehicle would not roll straight down a hill. In this scenario, the system may be programmed to not move the wheels so as to not affect the safety parameters of the vehicle. A steering wheel 14 torque being at a torque above a threshold could indicate the driver holding on the steering wheel 14, or an anti-theft device being used on the steering wheel 14, in which case rotation of the steering wheel 14 may not be desirable. A wheel 12 torque being at a torque above a threshold could indicate the wheel 12 being in a bound condition for vehicle transport, or other scenario in which the wheel 12 is unable to be turned, in which case attempted rotation of the wheel 12 may unnecessarily load the actuator 32, 34, 42 and/or components of the steering system 20.

A battery charge level being below a threshold level could indicate a battery charge level that may make it difficult to restart the vehicle 10 at a later date, and as such, it would be advantageous to not operate this system and place a further drain on the battery of the vehicle 10. A battery voltage level being at a level too high for safe powering of the actuator 32, 34, 42 may be when a 12V battery is 16V charging or during a 24V jump start. A pre-delivery plant mode may be when the vehicle 10 is placed in a mode designed to minimize power use until the vehicle 10 is sold.

The controller 52 may be further programmed to rotate the steering wheel a maximum distance such that the at least one wheel 12 on the vehicle is turned a maximum of 10 degrees. The steering wheel 14 may be left in any angular position from a center position of 0 degrees up to a return to the center position at 360 degrees. Whichever position the steering wheel 14 was left in before the initiation of the automatic positioning of the steering wheel 14 to provide partial visibility of the ignition 48 location, the last position of the steering wheel 14 may be referred to as a starting angular position. The steering-angle sensor 38 may be used to provide the location of the starting angular position to the controller 52.

The controller 52 may have a predetermined angular position of a steering wheel position that provides at least partial visibility of the ignition 48 programmed into the controller 52. The controller 52 may be programmed to rotate the steering wheel 14 from the starting angular position to the predetermined angular position. The controller 52 may be further programmed to rotate the steering wheel 14 in one of two directions that provides a shortest rotation distance from the starting angular position to the predetermined angular position. As well, there may be a number of predetermined angular positions that provide at least partial visibility of the ignition 48, and the controller 52 may be further programmed with this information and to rotate the steering wheel 14 from the starting angular position to one of the number of predetermined angular positions that requires the least amount of steering wheel rotation.

The vehicle 10 and/or steering system 20 may be configured such that a 90 degree rotation of the steering wheel 14 turns the wheel 10 degrees. The steering wheel 14 may also be designed such that at least one angular position providing at least partial visibility of the ignition 48 occurs within each 90 degree rotation of the steering wheel 14.

If the rotation of the steering wheel 14 from a starting angle to the predetermined angle that provides at least partial visibility of the ignition location requires more than 10 degrees of wheel turning to execute, then the controller 52 may be programmed to inhibit the rotation. Conversely, the controller 52 may be programmed to rotate the steering wheel 14 regardless of the degrees of turning of the wheel. For example, the controller 52 may be programmed to rotate the steering wheel 14 to a final position that is located 90 degrees clockwise from a center position each time regardless of starting position. The system may also be configured to allow the controller 52 to rotate the steering wheel 14 without turning the wheel 12 on the vehicle. An example of a way to accomplish this would be to engage a steer-by-wire steering system 36, or active front steering system and disengage the steering wheel 14 from the steering system 20.

The steering column 44 may also coordinate a steering-wheel column-lock 46 to be located at the final position. As the steering wheel 14 is rotated to the final position, the steering wheel 14 and/or steering-wheel shaft 24 may be rotated into a steering-wheel column-lock mechanism engaging the mechanism and locking the steering wheel 14 into position. The system may have only one locking location, such that the steering wheel 14 only locks in that one final position, such as 90 degrees clockwise from a center position.

Alternatively, the steering-wheel column-lock 46 may have a number of detents around the angular rotation of the steering wheel 14 and may be configured such that each detent is located at an angular position that is advantageous for locating the ignition 48. In this scenario, the steering wheel 14 and/or steering-wheel shaft 24 may be rotated into the steering-wheel column-lock mechanism engaging the mechanism and locking the steering wheel 14 into the closest available position that is advantageous for ignition locatability. The steering-wheel column-lock 46 may be used as a mechanical stop for the angular rotation of the steering wheel 14 and the rotation process ended when the steering wheel 14 surpasses a threshold torque value from being in the locked position. The system may also be used with a steering-wheel column-lock 46 that is engageable at any angular position of the steering wheel 14, in which the steering-wheel column-lock 46 is maintained in a non-engaged position allowing rotation of the steering wheel 14 until the final position is achieved, followed then by engaging the steering-wheel column-lock 46 to lock the steering wheel 14 in position.

The system as described above may also be configured to automatically rotate the steering wheel 14 into a locked position regardless of ignition locatability. This auto-steering-wheel-lock system could function nearly the same as described above and the controller 52 could be programmed to rotate the steering wheel based on an indication that the vehicle 10 is in a parked position to ensure the steering wheel 14 is in a locked position each time the vehicle 10 is parked. This feature could be used to improve safety of the parked vehicle as well as improving the anti-theft attributes of the vehicle.

Figure 2:
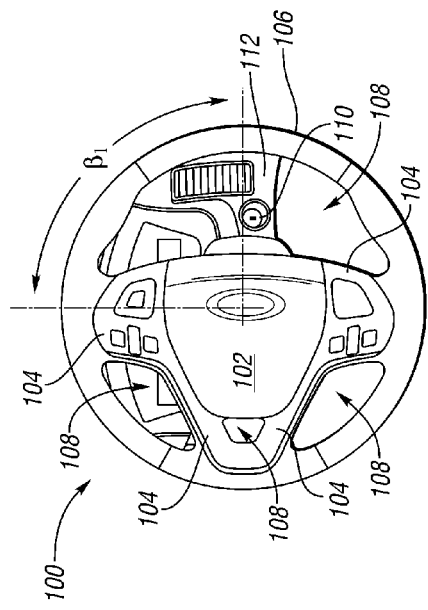
FIG. 2 is an exemplary driver's view of an ignition location when a steering wheel is at a center position.
Figure 4:
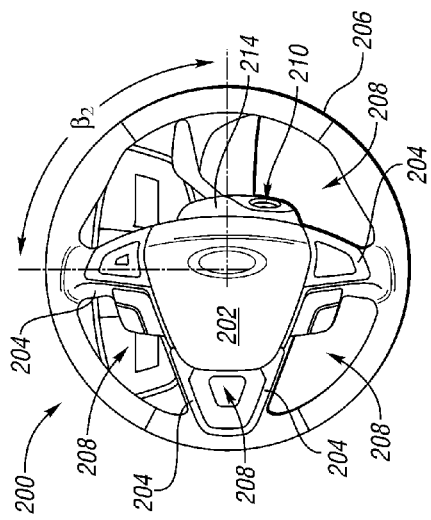
FIG. 4 is another exemplary driver's view of an ignition location when a steering wheel is at a center position.
Figure 3:
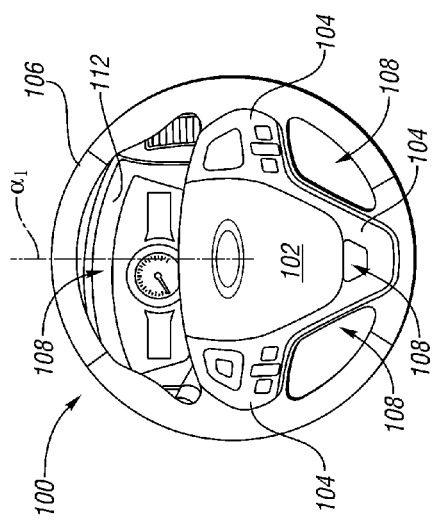
FIG. 3 is an exemplary driver's view from the same perspective as FIG. 2 with the steering wheel rotated to a position that provides at least partial visibility of an ignition located on an instrument panel.
Figure 5:
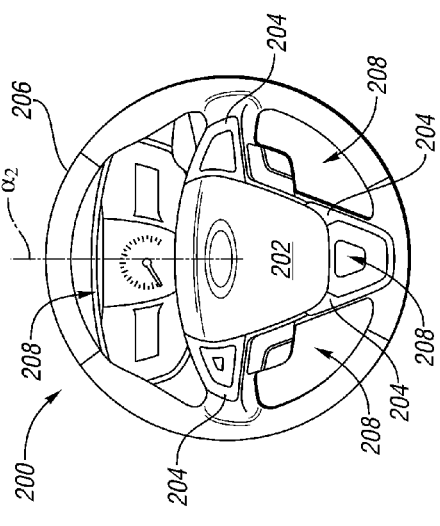
FIG. 5 is an exemplary driver's view from the same perspective as FIG. 4 with the steering wheel rotated to a position that provides at least partial visibility of an ignition located on a steering column.

FIGS. 2-5 show examples of steering wheels 100, 200 in a position with a lower level of ignition locatability $\alpha_1$ and $\alpha_2$ (FIGS. 2 and 4) and examples of steering wheels in a position with a greater level of ignition locatability $\beta_1$ and $\beta_{32}$ (FIGS. 3 and 5). Steering wheels 100, 200 each have a center hub 102, 202, at least two spokes 104, 204, and an outer ring 106, 206 connected to a center hub 102, 202 by the at least two spokes 104, 204, respectively. A number of visibility windows 108, 208 are defined by the steering wheels 100, 200. Each visibility window 108, 208 may be at least partially defined by the outer ring 106, 206, the center hub 102, 202, and at least two spokes 104, 204 and cooperate to frame the visibility windows 108, 208 through the steering wheels 100, 200.

FIGS. 2 and 3 are representative views of a vehicle having an ignition location 110 located on an instrument panel 112. An instrument panel 112 may also be referred to as a dash or board located behind or under the steering wheel 100. Instrument panel 112 does not have to have instruments on the panel in order to practice this embodiment. The steering wheel 100 in the position with the lower level of ignition locatability $\alpha_1$, as seen in FIG. 2, blocks the ignition location 110 from the driver. The steering wheel 100 in the position with the greater level of ignition locatability $\beta_1$, as seen in FIG. 3, allows at least partial visibility of the ignition location 110. Ignition location as used here means that the ignition itself may be visible to the driver, or a depression, scallop or other physical indication of the location of the ignition is visible to the driver. The ignition itself need not be visible to the driver, as long as an indication of the location of the ignition is visible to the driver aiding in the locating of the ignition. The steering wheel 100 is automatically rotated from the starting position $\alpha_1$ to the final position $\beta_1$ to provide at least partial visibility of the ignition location 110 through one of the visibility windows 108.

FIGS. 4 and 5 are representative of a vehicle having an ignition location 210 located on a steering column 214. The steering wheel 200 in the position with the lower level of ignition locatability $\alpha_2$, as seen in FIG. 4, blocks the ignition location 210 from the driver. The steering wheel 200 in the position with the greater level of ignition locatability $\beta_2$, as seen in FIG. 5, allows at least partial visibility of the ignition location 210. As before, ignition location as used here means that the ignition itself may be visible to the driver, or a depression, scallop or other physical indication of the location of the ignition is visible to the driver. The ignition itself need not be visible to the driver, as long as an indication of the location of the ignition is visible to the driver aiding in the locating of the ignition. The steering wheel 200 is automatically rotated from the starting position $\alpha_2$ to the final position $\beta_2$ to provide at least partial visibility of the ignition location 210 through one of the visibility windows 208.

The system uses a controller 52 to rotate steering wheel 100, 200 from a starting position $\alpha_1$, $\alpha_2$ to the final position $\beta_1$, $\beta_2$ to provide improved locatability of the ignition location 110, 210. This system may use a steering-angle sensor 38 (see FIG. 1) to measure the starting position $\alpha_2$, $\alpha_2$ and rotate the steering wheel 100, 200 to the predetermined angle $\beta_1$, $\beta_2$ to provide the improved visibility as described above. The controller 52 may be in communication with the steering-angle sensor 38 and may have a predetermined map of steering-wheel positions corresponding to levels of ignition locatability. The controller 52 may be further programmed to rotate the steering wheel 100, 200 to a position with a greater level of ignition locatability $\beta_1$, $\beta_2$ when the steering wheel is at a position with a lower level of ignition locatability $\alpha_1$, $\alpha_2$.

The controller 52 may be further programmed to rotate the steering wheel 100, 200 only if the steering wheel 100, 200 can be rotated from the position with the lower level of ignition locatability $\alpha_1$, $\alpha_2$ to the position with the greater level of ignition locatability $\beta_1$, $\beta_2$ with 10 degrees or less of corresponding vehicle-wheel 12 angular movement. The controller 52 may be preprogrammed with a relationship of steering-wheel rotation corresponding to vehicle-wheel angular movement. The controller 52 may be programmed to recognize an angular movement of the steering wheel 100, 200 that may exceed the 10 degree of turning of the wheel 12, and inhibit the steering wheel 100, 200 angular movement if it would result in exceeding the limit. The controller 52 may also work in combination with another vehicular system to allow the steering wheel 100, 200 to be turned without the turning of a vehicle-wheel 12.

Figure 6:
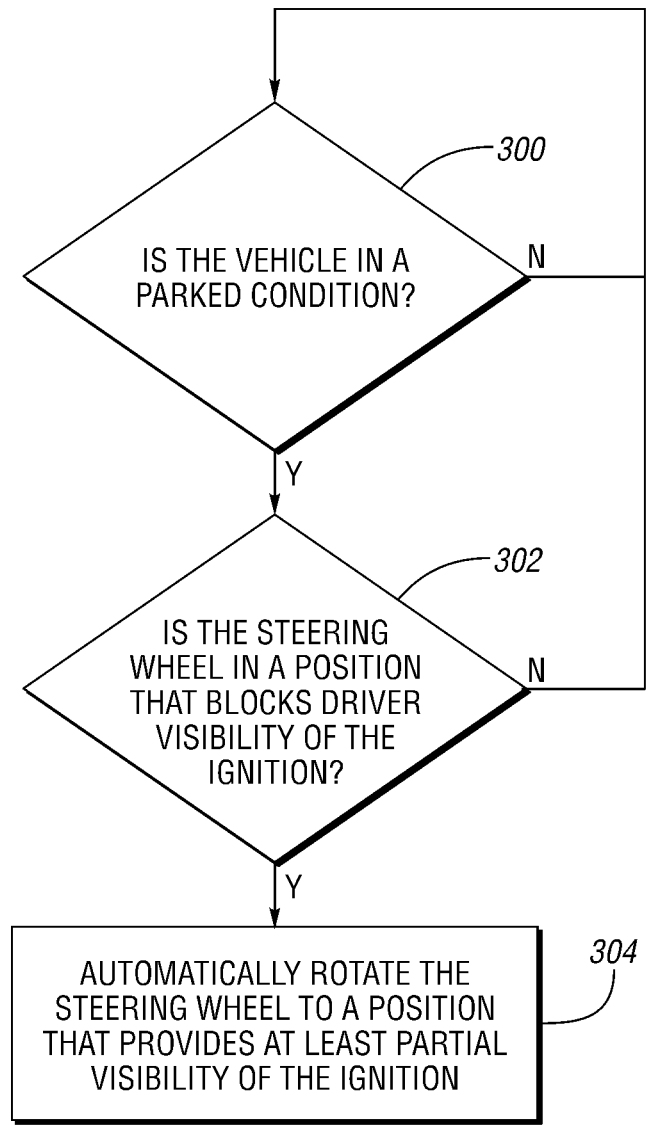
FIG. 6 is a flow chart diagram of a method for improving ignition locatability in a vehicle.

FIG. 6 shows a flow chart diagram of a method for improving ignition visibility in a vehicle. At step 300, the method checks to see if the vehicle is in a parked condition. An indication that the vehicle is in a parked condition may be when an automatic transmission is in park, when a parking brake is set, an autopark event concludes, or a remote start event is initiated. If the vehicle is not in a parked condition, then the method may du-loop at a reasonable sampling rate until such a condition occurs. If the vehicle is in a parked position, the method may proceed to step 302.

At step 302 the method checks if the steering wheel is in a position that substantially blocks driver visibility of the ignition. An indication that the steering wheel is in a position that substantially blocks driver visibility of the ignition may be ascertained by comparing the angular position of the steering wheel via a steering-angle sensor and comparing the angular position to a predetermined map of angular positions that substantially block the driver's visibility of the ignition. If the steering wheel is not in a position that substantially blocks driver visibility of the ignition, then the method may du-loop back to the beginning at a reasonable sampling rate until such a condition occurs. If the steering wheel is in a position that substantially blocks driver visibility of the ignition, then the method may move on to step 304. Step 300 and step 302 may be interchanged, and conducted in series or in parallel, as long as both conditions occur before moving to step 304. An additional stop may be placed in the programming sequence to only check if the steering wheel is in a position that blocks driver visibility of the ignition one time for every new indication that the vehicle has been placed in a parked condition.

At step 304, the steering wheel is rotated to a final position that provides at least partial visibility of an ignition. The method may use an actuator to rotate the steering wheel to the final angular position. The final angular position is different from the starting angular position in order to provide at least partial visibility of an ignition. The final angular position may be ascertained by comparing the actual angular position of the steering wheel via a steering-angle sensor and comparing the angular position to a predetermined map of angular positions that provide at least partial visibility of an ignition. The method may also employ the angular rotation of the steering wheel from the starting position to the closest final position providing visibility of the ignition. This rotation may be clockwise or counterclockwise depending on the closer of the angular differences.

The method may also include requiring additional conditions before automatically rotating the steering wheel to a position that provides at least partial visibility of the ignition. These additional conditions may include ascertaining if the vehicle is on a hill, ascertaining if the steering wheel is being held or bound, ascertaining if the battery charge in the vehicle is low, or ascertaining if the driver has exited the vehicle.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A system for improving vehicle ignition locatability comprising:
   an actuator capable of rotating a steering wheel;
   an indicator capable of providing an indication the vehicle is in a parked condition; and
   a controller in communication with the actuator and capable of accessing the indication, and programmed to rotate the steering wheel to a position that provides at least partial visibility of an ignition location based at least upon the vehicle being in a parked condition, and wherein the controller is in communication with a steering-angle sensor, the steering wheel position that provides at least partial visibility of the ignition corresponds to a predetermined steering angle, and the controller is further programmed to rotate the steering wheel from a starting angle to the predetermined steering angle.

2. The system of claim 1 wherein the indication the vehicle is in a parked condition is when an automatic transmission is in a park position.

3. The system of claim 1 wherein the indication the vehicle is in a parked condition is when a parking brake is set.

4. The system of claim 1 wherein the indication the vehicle is in a parked condition is a conclusion of an autopark event.

5. The system of claim 1 wherein the indication the vehicle is in a parked condition is a remote start event.

6. The system of claim 1 wherein the controller is further programmed to rotate the steering wheel based at least upon a second indicator of an action selected from a group consisting of a key being removed from the ignition, a driver seatbelt being opened, a driver seatbelt being closed, a driver exiting a driver seat, a driver entering a driver seat, a driver side door being closed, a driver side door being opened, a keyfob lock button being pressed, a keyfob unlock button being pressed, a keyfob remote start button being pressed, a keypad lock command being initiated, a keypad unlock command being initiated, a remote vehicle lock command being sent, and a remote vehicle unlock command being sent.

7. The system of claim 1 wherein the controller is further programmed to inhibit rotation of the steering wheel based at least upon a third indicator of a vehicle condition selected from a group consisting of the vehicle being parked at an angle above a threshold angle, a steering wheel torque being at a torque above a threshold torque, and a battery charge being at a charge level below a threshold charge level.

8. The system of claim 1 wherein the actuator is a power assist steering actuator as part of a power assist steering system.

9. The system of claim 1 wherein the steering wheel is connected to at least one wheel on the vehicle through a steering system and the controller is further programmed to rotate the steering wheel a maximum distance such that the at least one wheel on the vehicle is turned a maximum of 10 degrees.

10. The system of claim 1 wherein the steering wheel is in communication with at least one wheel on the vehicle through a steer-by-wire steering system and the controller is further programmed to rotate the steering wheel without turning any wheel on the vehicle.

11. The system of claim 1 wherein the controller is further programmed to rotate the steering wheel in one of two directions that provides a shortest rotation distance from the starting angle to the predetermined steering angle.

12. The system of claim 1 wherein there are a number of positions that provide at least partial visibility of the ignition and the controller is further programmed to rotate the steering wheel to one of the number of positions that requires the least amount of steering wheel rotation from a starting position.

13. The system of claim 1 wherein a final position that provides at least partial visibility of the ignition is located 90 degrees clockwise from a center position and the controller is further programmed to rotate the steering wheel to the final position to provide at least partial visibility of the ignition.

14. The system of claim 1 wherein the steering wheel has an outer ring connected to a center hub by at least two spokes, and wherein the outer ring, center hub and at least two spokes cooperate to frame a visibility window through the steering wheel, and the position that provides at least partial visibility of the ignition includes at least a portion of the visibility window of the steering wheel.

15. The system of claim 1 further including a steering wheel column lock capable of locking the steering wheel at the position that provides at least partial visibility of the ignition, and the controller is further programmed to rotate the steering wheel until the column lock engages.

16. A system for improving locatability of an ignition in a parked vehicle comprising:
a controller in communication with a steering-angle sensor configured to indicate a steering-wheel position and having a predetermined map of steering-wheel positions corresponding to levels of ignition locatability, and the controller programmed to rotate the steering wheel to a position with a greater level of ignition locatability when the steering wheel is at a position with a lower level of ignition locatability.

17. The system of claim 16 wherein the controller has a predetermined chart of steering-wheel rotation corresponding to vehicle-wheel angular movement, and the controller is further programmed to rotate the steering wheel if the steering wheel can be rotated from the position with the lower level of ignition locatability to the position with the greater level of ignition locatability with 10 degrees or less of corresponding vehicle-wheel angular movement.

18. A method for improving ignition visibility in a vehicle comprising:
rotating a steering wheel to a final position that provides at least partial visibility of an ignition based at least upon the steering wheel being in an initial position that substantially blocks driver visibility of the ignition and the vehicle being in a parked condition.

19. The method of claim 18 wherein the vehicle is in a parked condition when an automatic transmission is in park, when a parking brake is set, at a conclusion of an autopark event, or during a remote start event.

* * * * *